US009648210B2

(12) United States Patent
Segarra, Jr. et al.

(10) Patent No.: US 9,648,210 B2
(45) Date of Patent: May 9, 2017

(54) IMAGE FORMING APPARATUS INCLUDING CONTROLLER EXECUTING LOG-IN PROCESS TO PUT USER IN LOG-IN STATE AND IMAGE FORMING SYSTEM INCLUDING THE SAME

(71) Applicant: KYOCERA Document Solutions Inc., Osaka (JP)

(72) Inventors: Nixon Segarra, Jr., Osaka (JP); Irish Patricio, Osaka (JP); Mark Wayne Arcilla, Osaka (JP); Rodney Omangayon, Osaka (JP); Mary Rose Avenido, Osaka (JP); Jesus Jovannie John Burgos, Osaka (JP); Deniel Molina, Osaka (JP); John Paul Dingle, Osaka (JP); Cyril Dean Pilapil, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/084,938

(22) Filed: Mar. 30, 2016

(65) Prior Publication Data
US 2016/0295073 A1 Oct. 6, 2016

(30) Foreign Application Priority Data

Apr. 2, 2015 (JP) .................................. 2015-075760

(51) Int. Cl.
*H04N 1/44* (2006.01)
*H04N 1/00* (2006.01)

(52) U.S. Cl.
CPC ....... *H04N 1/4413* (2013.01); *H04N 1/00037* (2013.01); *H04N 1/00076* (2013.01);
(Continued)

(58) Field of Classification Search
None
See application file for complete search history.

(56) References Cited

U.S. PATENT DOCUMENTS 3,569,940 A * 3/1971 McFadden ............ G06F 11/327
700/80

FOREIGN PATENT DOCUMENTS

| JP | 2005084440 A | * 3/2005 |
| JP | 2005340894 A | * 12/2005 |
| JP | 2011-160218 A | 8/2011 |

* cited by examiner

*Primary Examiner* — Thomas D Lee
(74) *Attorney, Agent, or Firm* — Studebaker & Brackett PC

(57) ABSTRACT

An image forming apparatus includes an original setting part, an original reading device, an opening/closing member, a locking mechanism, a notifying mechanism, an original detecting part, a user detecting part and a controlling part. The opening/closing member is switchable between an opening posture and a closing posture. The locking mechanism holds the opening/closing member in the closing posture. The notifying mechanism notifies a user that the original is left behind on the original setting part. The controlling part operates the locking mechanism and the notifying mechanism on condition that the original detecting part detects the original and the user detecting part does not detect the user in a state where the original reading device has finished reading the original. The controlling part stops operation of the locking mechanism on condition that authentication of a specific user succeeds in a state where the locking mechanism is operated.

11 Claims, 12 Drawing Sheets

(52) U.S. Cl.
CPC ..... *H04N 1/00079* (2013.01); *H04N 1/00204* (2013.01); *H04N 1/00411* (2013.01); *H04N 1/00554* (2013.01); *H04N 1/00689* (2013.01); *H04N 1/00925* (2013.01); *H04N 2201/0094* (2013.01)

IMAGE FORMING APPARATUS INCLUDING CONTROLLER EXECUTING LOG-IN PROCESS TO PUT USER IN LOG-IN STATE AND IMAGE FORMING SYSTEM INCLUDING THE SAME

INCORPORATION BY REFERENCE

This application is based on and claims the benefit of priority from Japanese patent application No. 2015-075760 filed on Apr. 2, 2015, the entire contents of which are incorporated herein by reference.

BACKGROUND

The present disclosure relates to an image forming apparatus and an image forming system including the same.

There is an image forming apparatus including an original reading device configured to read an original set on an original setting part. In the image forming apparatus including such an original reading device, there is a case that a user leaves the original on the original setting part after the original reading device has finished reading the original.

Then, there is an art to give a warning to the user when the user leaves behind the original on the original setting part.

However, by only giving the warning to the user as described above, there is a risk that an unauthorized outsider extracts the original left behind by the user and confidential information of the original is leaked when the user does not become aware of the warning.

SUMMARY

In accordance with an embodiment of the present disclosure, an image forming apparatus includes an original setting part, an original reading device, an opening/closing member, a locking mechanism, a notifying mechanism, an original detecting part, a user detecting part and a controlling part. On the original setting part, an original is set. The original reading device is configured to read the original set on the original setting part. The opening/closing member is configured to be switchable between an opening posture to allow extraction of the original from the original setting part and a closing posture to restrict the extraction of the original from the original setting part. The locking mechanism is configured to hold the opening/closing member in the closing posture. The notifying mechanism is configured to notify a user that the original is left behind on the original setting part. The original detecting part is configured to detect the original set on the original setting part. The user detecting part is configured to detect the user. The controlling part is configured to execute a log-in process to put the user in a log-in state. The controlling part is configured to operate the locking mechanism and the notifying mechanism on condition that the original detecting part detects the original and the user detecting part does not detect the user in a state where the original reading device has finished reading the original. The controlling part is configured to stop operation of the locking mechanism on condition that authentication of a specific user succeeds in a state where the locking mechanism is operated.

In accordance with an embodiment of the present disclosure, an image forming system includes the image forming apparatus and a terminal device. The terminal device is connected to the image forming apparatus via a network.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
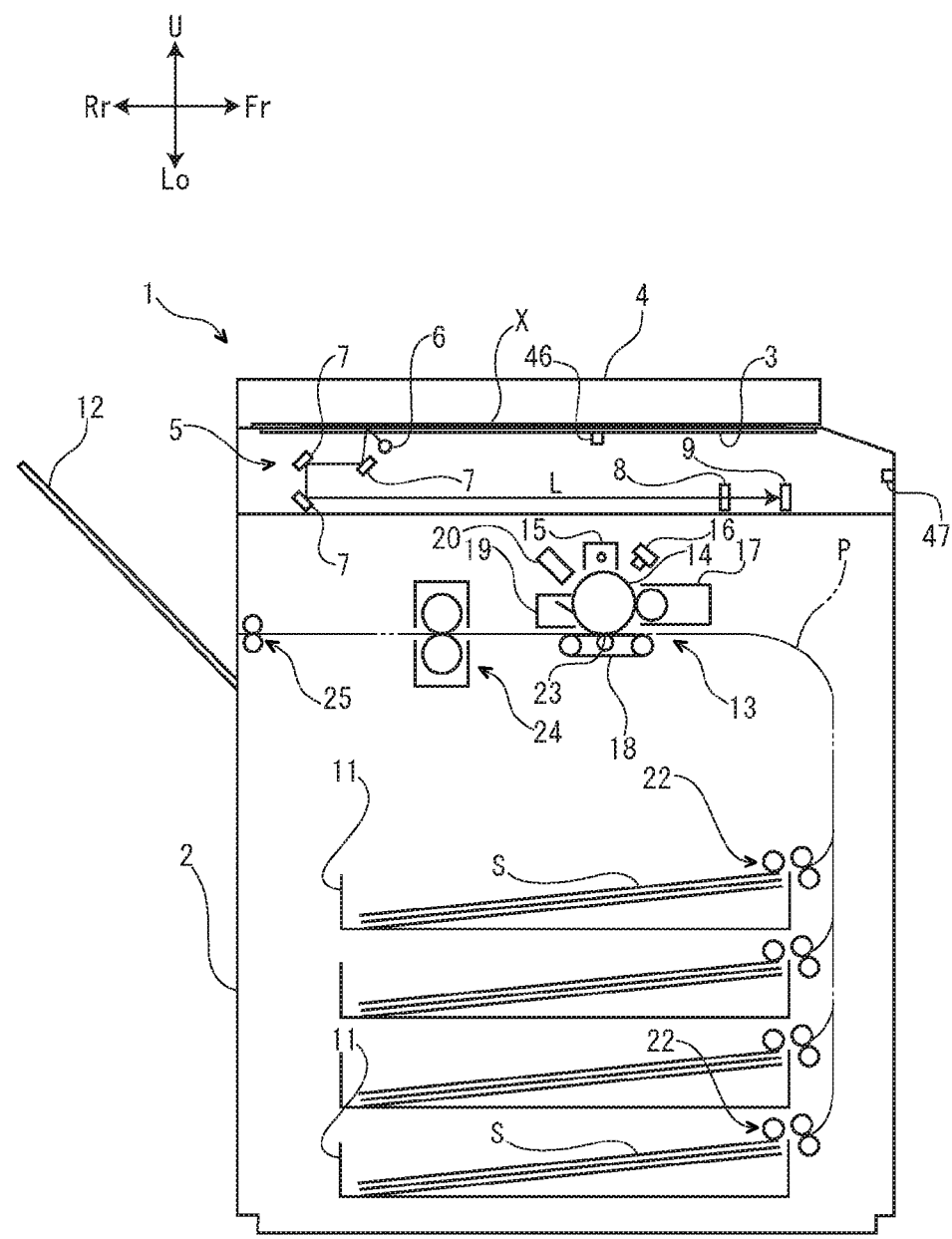
FIG. 1 is a schematic diagram showing an outline of an MFP according to an embodiment of the present disclosure.

Hereinafter, an MFP (multifunction peripheral) 1 as an image forming apparatus according to an embodiment of the present disclosure will be described with reference to FIGS. 1 to 4. Incidentally, a right side of FIG. 1 will be described as a front side of the MFP 1, for convenience of explanation. Arrows Fr, Rr, L, R, U and Lo of each figure indicate a front side, a rear side, a left side, a right side, an upper side and a lower side of the MFP 1, respectively.

Firstly, a schematic configuration of the MFP 1 will be described with reference to FIG. 1.

The MFP 1 includes a MFP main body 2 (apparatus main body) of a box shape. At an upper end part of the MFP main body 2, a contact glass 3 (original setting part) is provided. On the contact glass 3, an original X is set. Above the contact glass 3, a cover 4 (opening/closing member) is provided. Below the contact glass 3, an original reading device 5 is provided. The original reading device 5 includes a light source 6, a plurality of mirrors 7, a lens 8 and an image sensor 9.

At a lower part of the MFP main body 2, a plurality of sheet cassettes 11 are housed. In each sheet cassette 11, sheets S (recording media) are housed. At a rear face of the MFP main body 2, a sheet ejection tray 12 is protruded.

At an upper part of the MFP main body 2, an image forming part 13 is housed. The image forming part 13 includes a photosensitive drum 14 (image carrier), a charger 15, an exposure device 16, a developing device 17, a transferring device 18, a cleaning device 19 and a static eliminator 20.

Inside the MFP main body 2, a conveying path P for conveying the sheets S is provided. At an upstream end part of the conveying path P, a plurality of sheet feeding units 22 are provided at an upper right side of each sheet cassette 11. At a midstream part of the conveying path P, a transferring part 23 is provided between the photosensitive drum 14 and the transferring device 18. At a downstream part of the conveying path P, a fixing device 24 is provided. At a downstream end part of the conveying path P, a sheet ejecting unit 25 is provided.

Next, an operation of the MFP 1 will be described by using a copying operation as an example.

When an instruction to start copying is given to the MFP 1, the light source 6 of the original reading device 5 emits light (see an arrow L in FIG. 1). This light is reflected by the original X set on the contact glass 3, and returned by a plurality of mirrors 7, passes through the lens 8 and reaches the image sensor 9. Thus, the original X set on the contact glass 3 is read by the original reading device 5.

Further, the instruction to start copying is given to the MFP 1 as described above, the charger 15 charges a surface of the photosensitive drum 14. Next, based on data of the original X read by the original reading device 5, the exposure device 16 exposes the photosensitive drum 14 so as to form an electrostatic latent image on the photosensitive drum 14. Next, this electrostatic latent image is developed as a toner image by the developing device 17. Incidentally, a toner (developer) and a charge which remain on the photosensitive drum 14 are removed by the cleaning device 19 and the static eliminator 20, respectively.

Meanwhile, each sheet S taken from each sheet cassette 11 by each sheet feeding unit 22 is conveyed in the conveying path P toward a downstream side, and enters the transferring part 23. In this transferring part 23, a toner image on the photosensitive drum 14 is transferred to each sheet S. Each sheet S to which the toner image has been transferred is further conveyed in the conveying path P toward the downstream side, and enters the fixing device 24. In this fixing device 24, the toner image is fixed to each sheet S. Each sheet S to which the toner image has been fixed is ejected to the sheet ejection tray by the sheet ejecting unit 25. Thus, the copying operation is finished.

Next, a configuration of the MFP main body 2 will be further described with reference to FIGS. 2 to 4.

Figure 2:
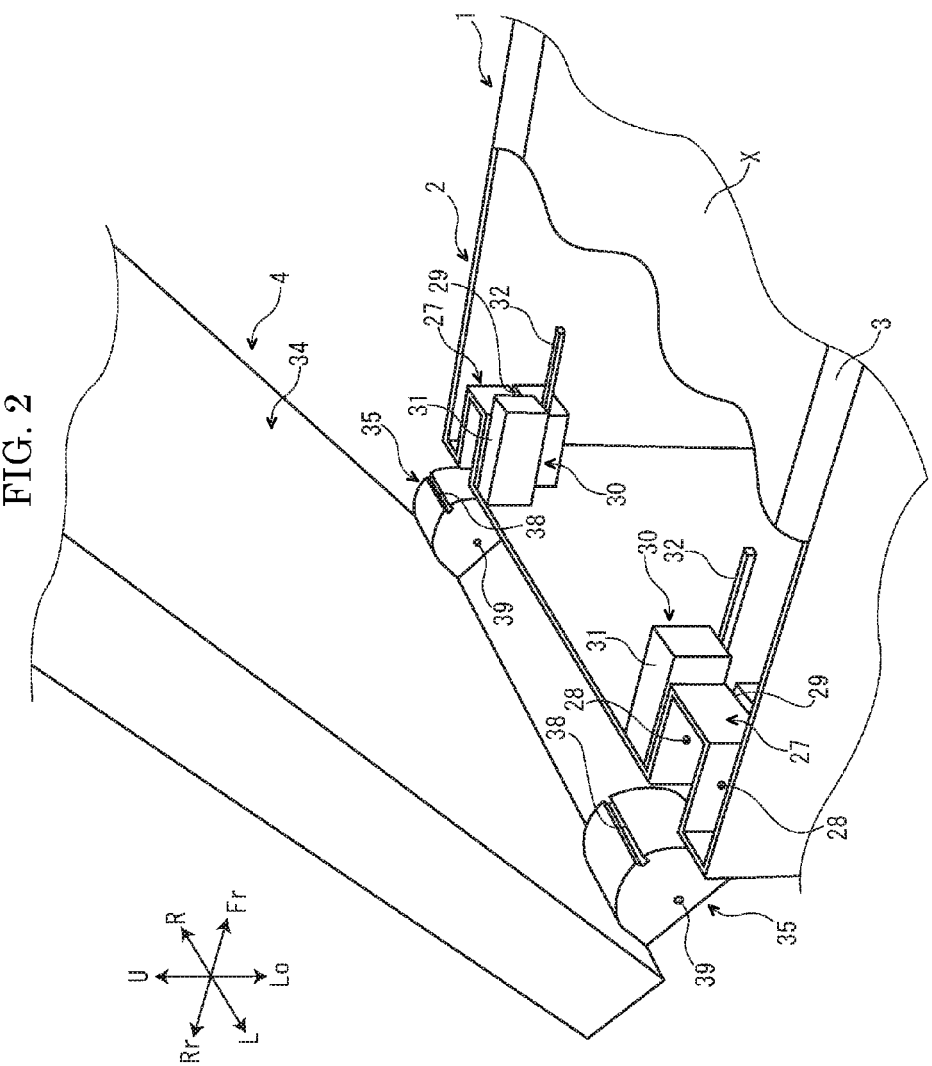
FIG. 2 is an exploded perspective view seen from a left front side and showing a rear upper part of the MFP according to the embodiment of the present disclosure.
Figure 3:
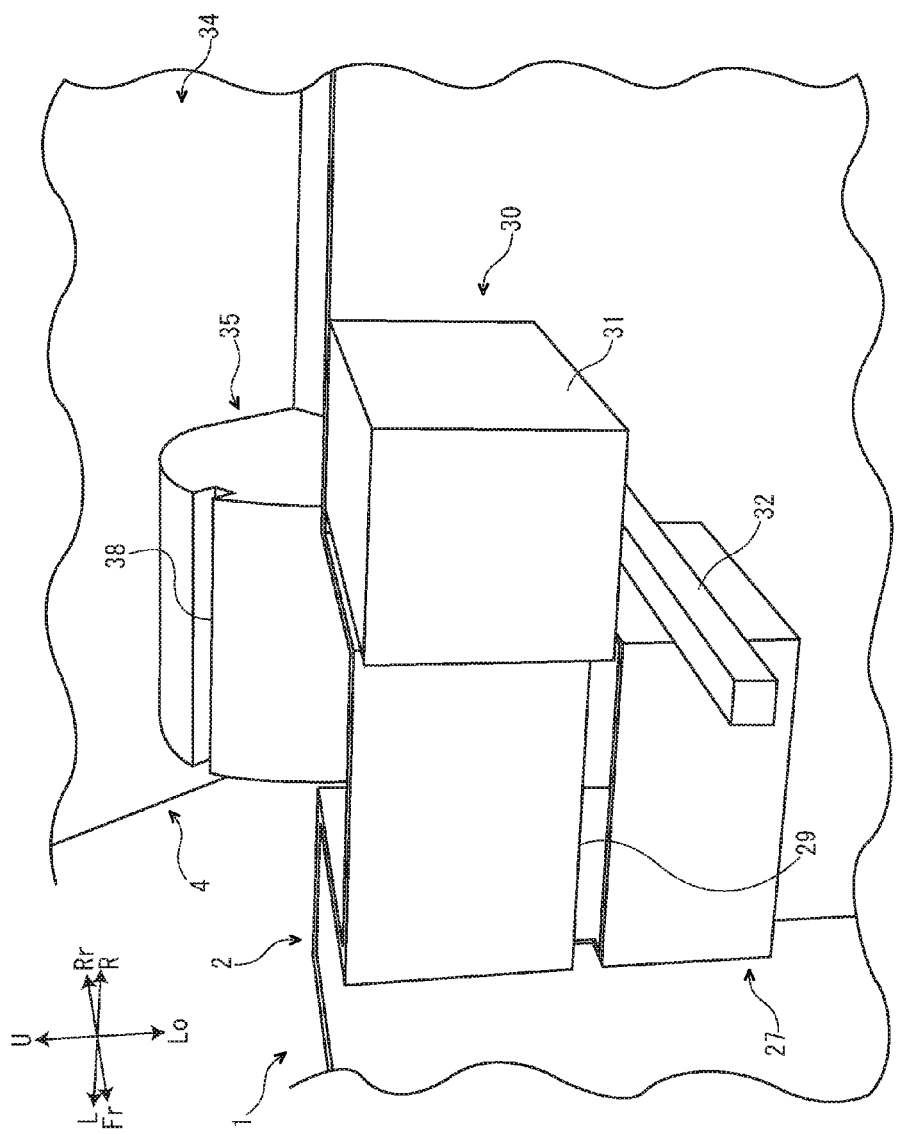
FIG. 3 is an exploded perspective view seen from a right front side and showing the rear upper part of the MFP according to the embodiment of the present disclosure.

As shown in FIGS. 2 and 3, at an upper rear part of the MFP main body 2, a pair of left and right insertion parts 27 are formed. Each insertion part 27 is formed in a rectangular box shape whose upper face side and rear face side are opened. At upper parts of both left and right side faces of each insertion part 27, spindle holes are formed. At an upper-and-lower direction center part of a front face of each insertion part 27, a slit-like insertion groove 29 is formed.

At an upper rear part of the MFP main body 2, and at insides of the insertion parts 27 in a left and right direction, locking mechanisms 30 are provided. Each locking mechanism 30 includes a motor 31 and a lock piece 32 which is attached to the motor 31. The motor 31 is configured to be rotated by 90 degrees in a clockwise direction or a counterclockwise direction in a plan view by changing the polarity of a pair of electrodes based on a binary signal (1, 0 or 0, 1). The lock piece 32 is configured to be rotated between an unlock position (see FIGS. 2 and 3) and a lock position (see FIG. 4) with a rotation of the motor 31.

Next, a configuration of the cover 4 will be further described with reference to FIGS. 2 to 4.

As shown in FIGS. 2 and 3, the cover 4 includes a main body part 34 formed in a flat cuboid shape and a pair of left and right pivot parts 35 protruded at a rear end part of a lower face of the main body part 34. Incidentally, the cover 4 may have a function as an automatic original conveying device which automatically conveys the original X to the contact glass 3.

Each pivot part 35 of the cover 4 is inserted in each insertion part 27 of the MFP main body 2. A front face of each pivot part 35 is curved forward. At the front face of each pivot part 35, a lock groove 38 is formed.

In each pivot part 35 of the cover 4, a through-hole 39 is formed in the left and right direction. Through the through-hole 39, a spindle (not shown) penetrates, and both end parts of this spindle engage with the spindle holes 28 of the insertion parts 27 of the MFP main body 2. According to this configuration, the cover 4 is openably/closably supported by the MFP main body 2. The cover 4 is switchable between an opening posture (see FIGS. 2 and 3) at which the main body part 34 exposes a top face of the contact glass 3 to allow extraction of the original X from the contact glass 3 and a closing posture (see FIG. 4) at which the main body part 34 completely covers the top face of the contact glass 3 to restrict the extraction of the original X from the contact glass 3.

Next, an operation of each locking mechanism 30 will be described.

In a state where the lock piece 32 of each locking mechanism 30 is at an unlock position (see FIGS. 2 and 3), the lock piece 32 of each locking mechanism 30 does not engage with the lock groove 38 of each pivot part 35 of the cover 4. Consequently, it is possible to switch the cover 4 from the closing posture to the opening posture.

Figure 4:
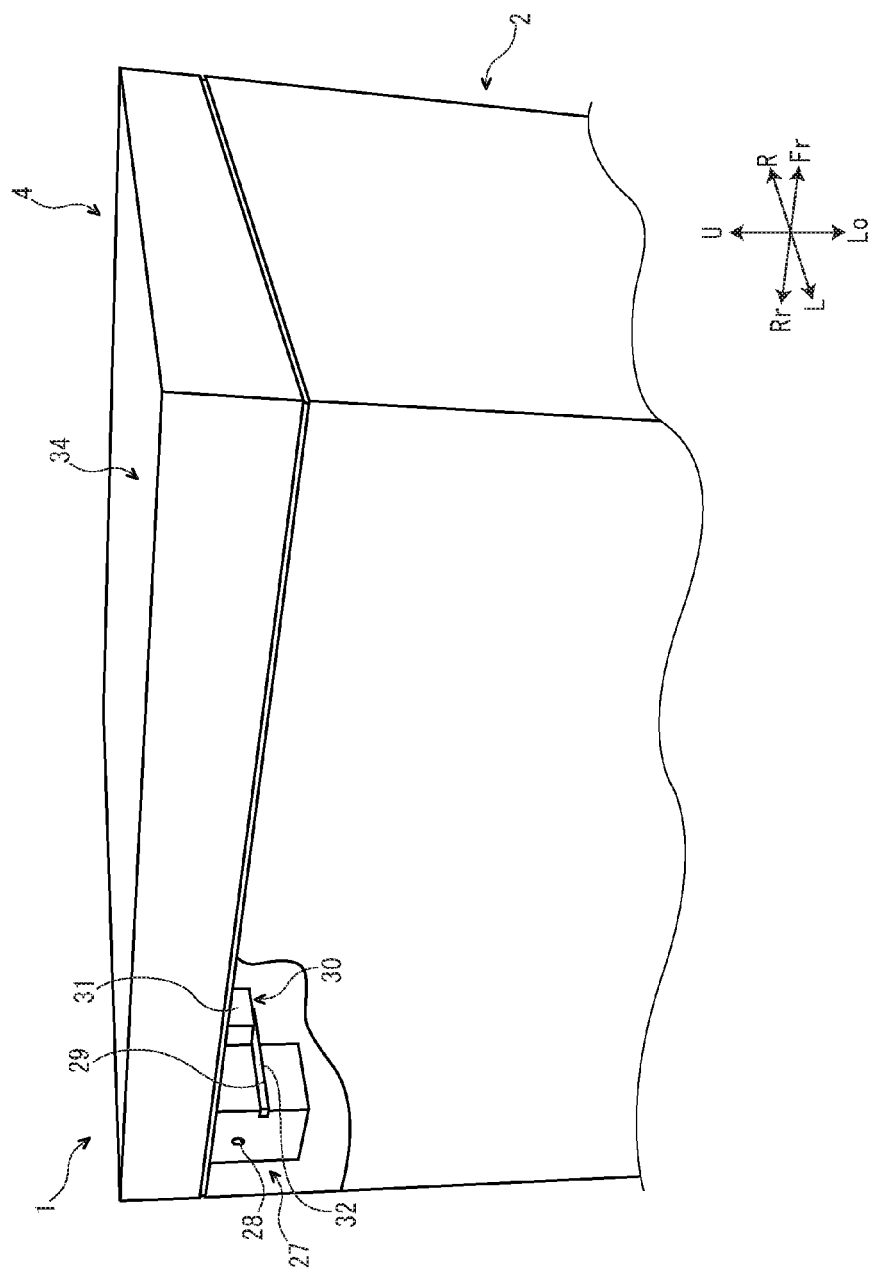
FIG. 4 is a perspective view seen from a left front side and showing an upper part of the MFP according to the embodiment of the present disclosure.

From this state, when the motor 31 of the left locking mechanism 30 is rotated by 90 degrees in the clockwise direction in the plan view and the motor 31 of the right locking mechanism 30 is rotated by 90 degrees in the counterclockwise direction in the plan view, the lock piece 32 of each locking mechanism 30 is rotated from the unlock position (see FIGS. 2 and 3) to the lock position (see FIG. 4). As a result of this rotation, the lock piece 32 of each locking mechanism 30 enters each insertion part 27 of the MFP main body 2 via the insertion groove 29, and engages with the lock groove 38 of each pivot part 35 of the cover 4. According to this, the cover 4 is prevented from being switched from the closing posture to the opening posture, and the cover 4 is held in the closing posture. That is, each locking mechanism 30 is operated.

From this state, when the motor 31 of the left locking mechanism 30 is rotated by 90 degrees in the counterclockwise direction in the plan view and the motor 31 of the right locking mechanism 30 is rotated by 90 degrees in the clockwise direction in the plan view, the lock piece 32 of each locking mechanism 30 is rotated from the lock position (see FIG. 4) to the unlock position (see FIGS. 2 and 3). As a result of this rotation, the lock piece 32 of each locking mechanism 30 is detached from the lock groove 38 of each pivot part 35 of the cover 4. According to this, the cover 4 can be switched from the closing posture to the opening posture. That is, the operation of each locking mechanism 30 is stopped.

Incidentally, each locking mechanism 30 is an example of a locking mechanism, and a configuration of the locking mechanism is not limited to the configuration of each locking mechanism 30, and any configuration of the locking mechanism may be used as long as the configuration can hold the cover 4 in the closing posture.

Next, an image forming system 40 according to the embodiment of the present disclosure will be described with reference to FIGS. 1 and 5.

Figure 5:
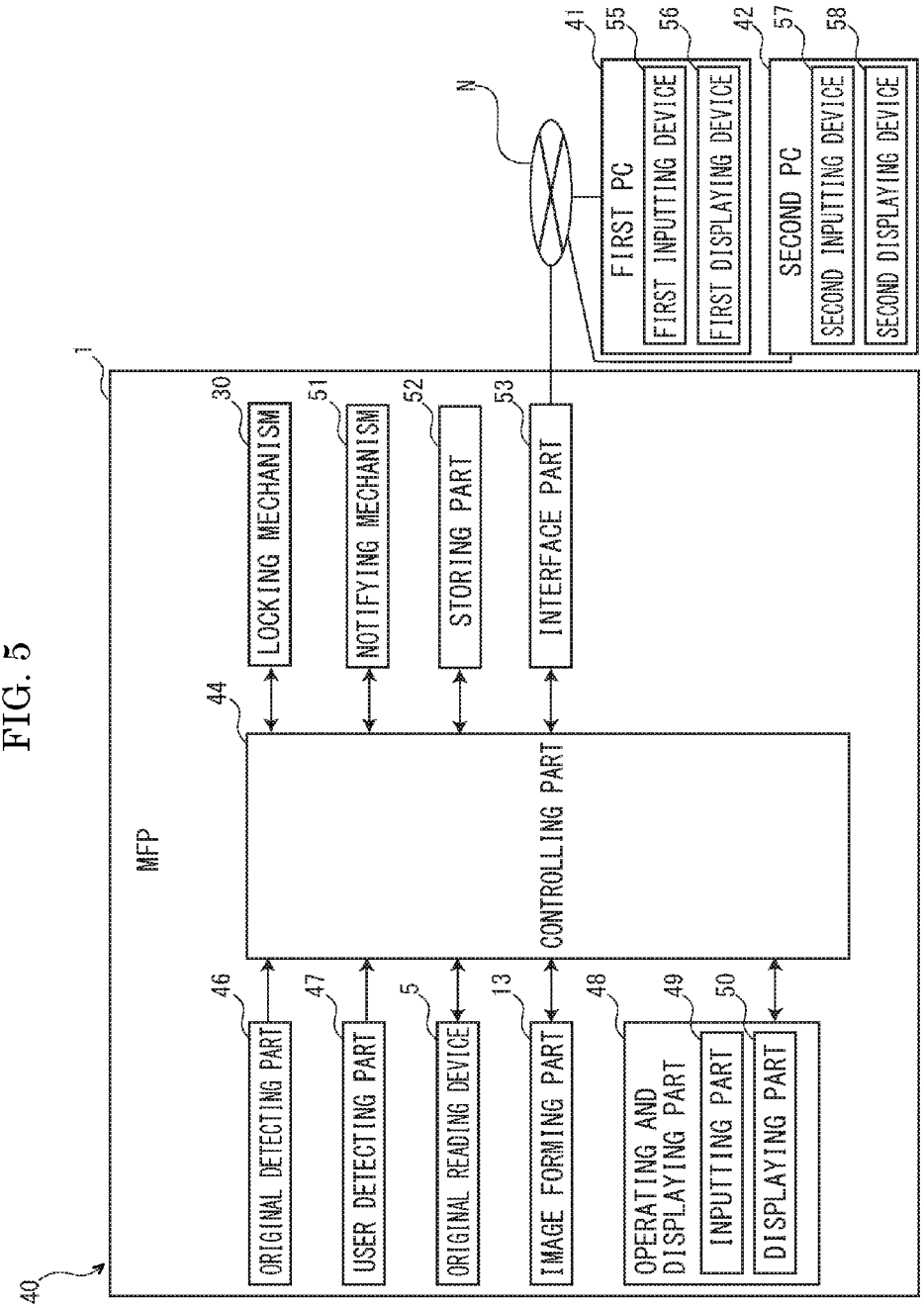
FIG. 5 is a block diagram showing an image forming system according to the embodiment of the present disclosure.

As shown in FIG. 5, the image forming system 40 includes the above-mentioned MFP 1, a first PC 41 (terminal device) which is connected to the MFP 1 via a network N, and a second PC 42 (terminal device) which is connected to the MFP 1 via the network N.

The MFP 1 includes a controlling part 44. The controlling part 44 is connected to an original detecting part 46. As shown in FIG. 1, the original detecting part 46 is provided near the contact glass 3. The original detecting part 46 is composed of a reflection sensor including a light emitting part which emits light toward the original X and a light receiving part which receives light reflected from the original X, for example, and detects the original X set on the contact glass 3 based on a light receiving amount of the light receiving part.

As shown in FIG. 5, the controlling part 44 is connected to a user detecting part 47. As shown in FIG. 1, the user detecting part 47 is provided at a front end part of the MFP main body 2. The user detecting part 47 is an infrared sensor which includes a piezoelectric element which receives an infrared ray produced in response to a motion of a user, for example, and detects a user in a specific area around the MFP 1 (e.g. a front area of the MFP 1).

As shown in FIG. 5, the controlling part 44 is connected to the original reading device 5. The original reading device 5 reads the original X set on the contact glass 3 based on a signal from the controlling part 44.

The controlling part 44 is connected to the image forming part 13. The image forming part 13 performs an image forming operation based on a signal from the controlling part 44.

The controlling part 44 is connected to an operating and displaying part 48. The operating and displaying part 48 includes an inputting part 49 and a displaying part 50. The inputting part 49 includes operation keys such as a start key, a stop/clear key, a power key and a numerical keypad. The displaying part 50 is composed of a touch panel which displays an operation screen, for example. Incidentally, the touch panel may be used as the inputting part 49, too.

The controlling part 44 is connected to the locking mechanism 30. Each locking mechanism 30 is operated based on a signal from the controlling part 44, and holds the cover 4 in the closing posture.

The controlling part 44 is connected to a notifying mechanism 51. The notifying mechanism 51 is operated based on a signal from the controlling part 44, generates a warning sound (alarm) and notifies the user that the original X is left on the contact glass 3.

The controlling part 44 is connected to a storing part 52 which is composed of a storage device such as a ROM or a RAM. The storing part 52 stores identification information of a first user who has an administrative authority and identification information of a second user who does not have the administrative authority, respectively. Each identification information of the first user and the second user stored in the storing part 52 includes, a user name, a password and a contact address such as an e-mail address and a telephone number, for example. The storing part 52 stores an operation time T1 (e.g. 30 seconds) of the notifying mechanism 51. The storing part 52 stores a stand-by time T2 (e.g. 30 seconds) of each locking mechanism 30.

The controlling part 44 is connected to an interface part 53. The interface part 53 is capable of communicating with the first PC 41 and the second PC 42 via the network N such a WAN (Wide Area Network) or a LAN (Local Area Network). Incidentally, the network N may be a wired network or a wireless network.

The first PC 41 is a PC (Personal Computer) of the first user (the user who has the administrative authority and whose identification information is stored in the storing part 52). The first PC 41 includes a first inputting device 55 and a first displaying device 56. The first inputting device 55 includes a keyboard and a mouse, for example. The first displaying device 56 is composed of a monitor, for example.

The second PC 42 is a PC (Personal Computer) of the second user (the user who does not have the administrative authority and whose identification information is stored in the storing part 52). The second PC 42 includes a second inputting device 57 and a second displaying device 58. The second inputting device 57 includes a keyboard and a mouse, for example. The second displaying device 58 is composed of a monitor, for example.

Figure 6:
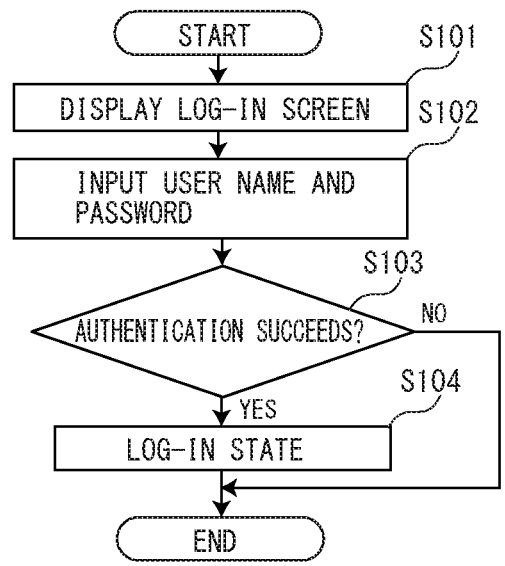
FIG. 6 is a flow chart showing a log-in process of a user, in the image forming system according to the embodiment of the present disclosure.
Figure 7:
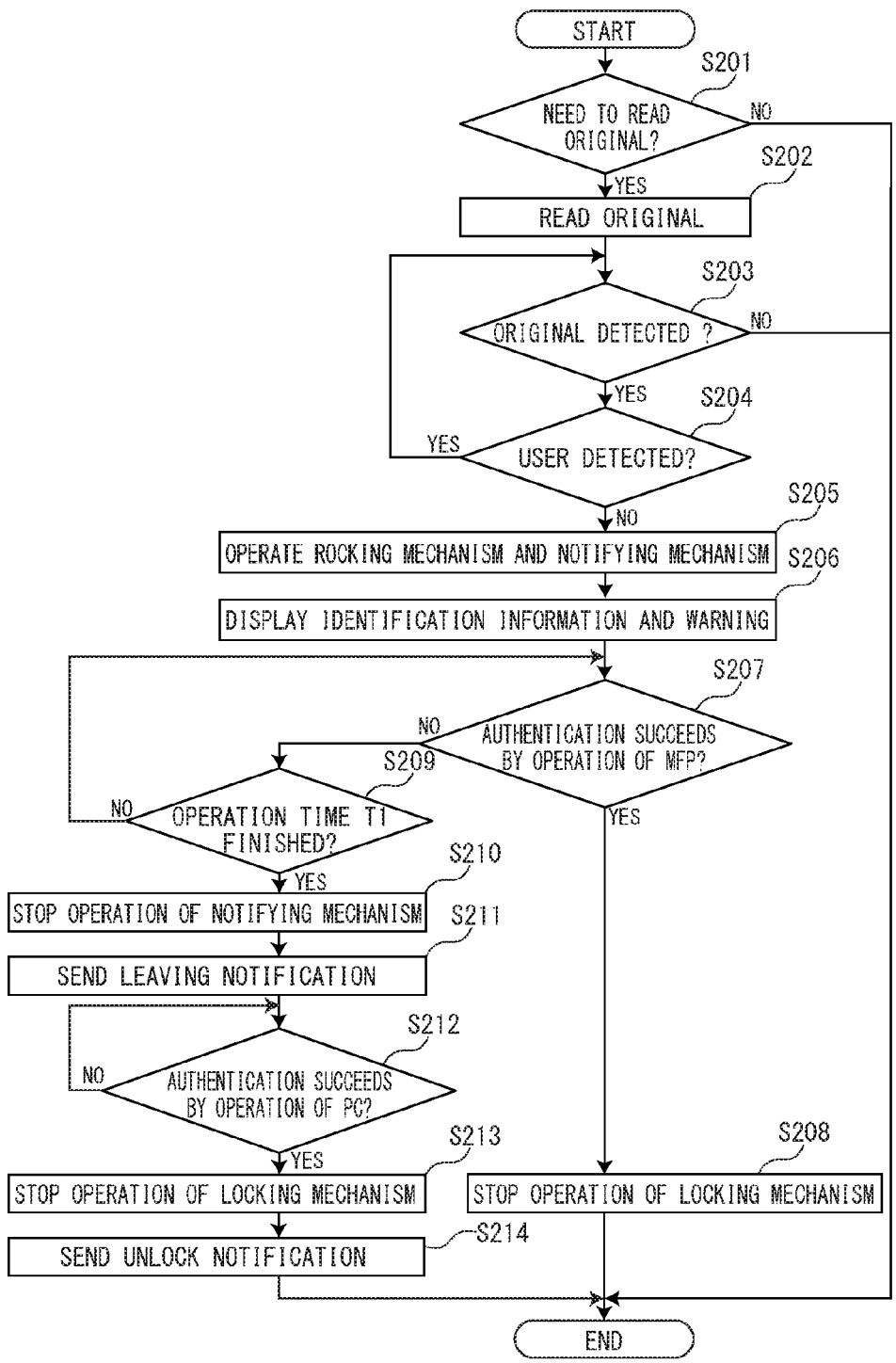
FIG. 7 is a flow chart showing a first embodiment of control to prevent leaving behind of an original and unfair extraction of the original, in the image forming system according to the embodiment of the present disclosure.

In the image forming system 40 applying the above-mentioned configuration, when a user starts using the MFP 1, the controlling part 44 executes a log-in process to put a user in a log-in state. An example of this log-in process will be described with reference to FIG. 6.

Firstly, based on a log-in request from the user, the displaying part 50 of the MFP 1 displays a log-in screen (step S101).

Next, while checking this log-in screen, the user inputs a user name and a password (step S102).

Next, based on the user name and the password inputted by the user, the controlling part 44 judges whether or not authentication of the user succeeds (step S103). For example, the controlling part 44 judges which user name and password stored in the storing part 52 match the user name and the password inputted by the user.

When the authentication of the user succeeds (YES in step S103), the controlling part 44 put the user whose authentication succeeds in a log-in state (step S104), the storing part 52 stores the user put in the log-in state and the log-in process is finished. When the authentication of the user fails (NO in step S103), the log-in process is finished without putting the user whose authentication fails in the log-in state by the controlling part 44.

Next, with reference to FIGS. 7, 8, 9A and 9B, a first embodiment (hereinafter, referred to simply as "the first embodiment") of control to prevent leaving behind of the original X and unfair extraction of the original X will be described by using a case where the second user makes the original reading device 5 read the original X as an example.

Incidentally, "a case where the second user makes the original reading device 5 read the original X" includes a case where the second user is in the log-in state and a case where no user is in the log-in state and a user who has logged out last is the second user.

First, the controlling part 44 judges whether or not the original reading device 5 needs to read the original X, based on a request from the user (step S201). When the original reading device 5 does not need to read the original X (NO in step S201), the first embodiment ends. Incidentally, a case where the original reading device 5 does not need to read the original X is a case where the user requests execution of a printing function, for example.

When the original reading device 5 needs to read the original X (YES in step S201), the original reading device 5 reads the original X (step S202). Incidentally, the case where the original reading device 5 needs to read the original X is a case where the user requests execution of a scanner function, a facsimile transmission function or a copying function, for example.

When the original reading device 5 has finished reading the original X, the flow is transferred to judge as to whether or not the original detecting part 46 detects the original X (step S203). When the original detecting part 46 does not detect the original X (NO in step S203), the first embodiment ends.

When the original detecting part 46 detects the original X (YES in step S203), the flow is transferred to judge as to whether or not the user detecting part 47 detects the user (step S204). When the user detecting part 47 detects the user (YES in step S204), the flow is transferred to step S203.

When the user detecting part 47 does not detect the user (NO in step S204), the controlling part 44 simultaneously operates each locking mechanism 30 and the notifying mechanism 51 (step S205). Thus, each locking mechanism 30 holds the cover 4 in the closing posture, and the warning sound (alarm) generated by the notifying mechanism 51 notifies the user that the original X is left behind on the contact glass 3.

Figure 8:
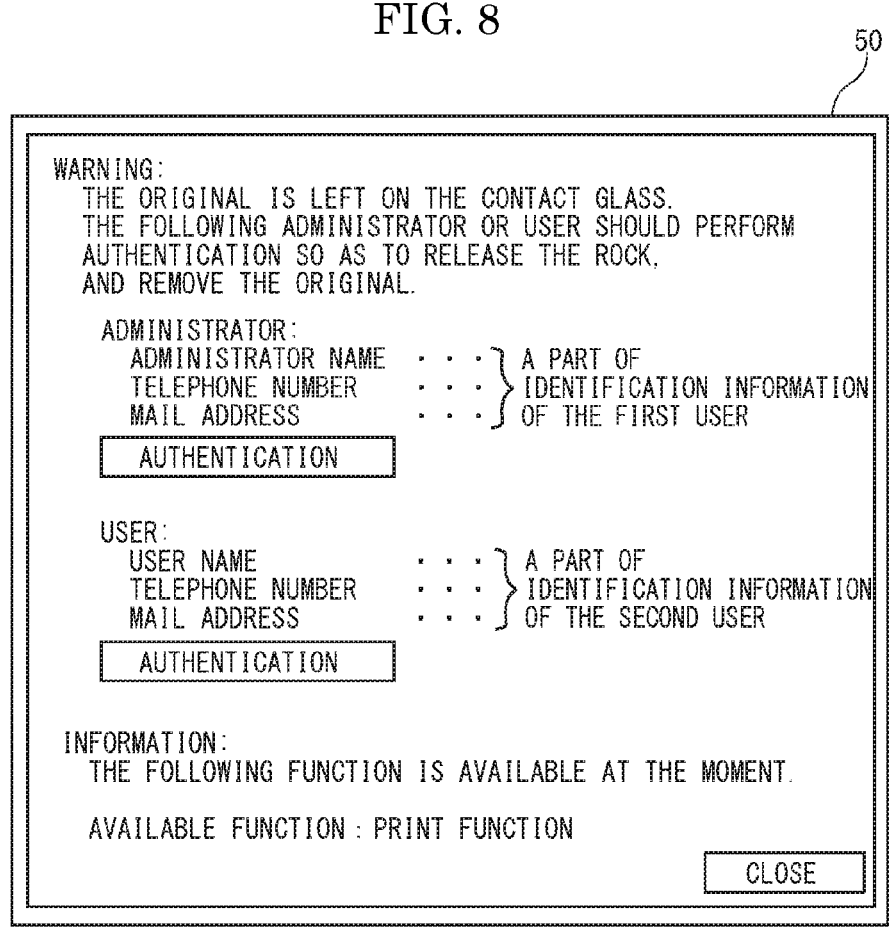
FIG. 8 is a view showing an example of an operation screen on which a part of identification information of a first user and a second user and a warning are displayed, in a displaying part according to the embodiment of the present disclosure.

Next, the controlling part 44 makes the displaying part 50 of the MFP 1 display each identification information of the first user and the second user and a warning related to leaving behind of the original X on the contact glass 3 (step S206). FIG. 8 shows an example of a warning screen of the displaying part 50 of the MFP 1 in this case. Incidentally, the displaying part 50 displays a function (e.g. a printing function) which is available even in a state where each locking mechanism 30 is operated, on the warning screen shown in FIG. 8 or the screen displayed when this warning screen is closed.

When the screen shown in FIG. 8 is displayed, the first user or the second user pushes an "AUTHENTICATION" button, and inputs a password. Next, the controlling part 44 judges whether or not the authentication of one of the first user and the second user succeeds by operation of the inputting part 49 of the MFP 1 (step S207). For example, the controlling part 44 judges whether or not a password inputted to the inputting part 49 of the MFP 1 matches with the password of the first user or the second user stored in the storing part 52.

When the authentication of one of the first user and the second user succeeds by the operation of the inputting part 49 of the MFP 1 (YES in step S207), the controlling part 44 stops the operation of each locking mechanism 30 (step S208). According to this, the user can switch the cover 4 from the closing posture to the opening posture, and extract the original X which is left behind on the contact glass 3. Thus, the first embodiment ends.

When authentication of none of the first user and the second user succeeds by the operation of the inputting part 49 of the MFP 1 (NO in step S207), the controlling part 44 judges whether or not the operation time T1 of the notifying mechanism 51 is finished (step S209). When the operation time T1 of the notifying mechanism 51 is not finished (NO in step S209), the flow is transferred to step S207.

When the operation time T1 of the notifying mechanism 51 is finished (YES in step S209), the controlling part 44 continues the operation of each locking mechanism 30 and stops the operation of the notifying mechanism 51 (step S210).

Figure 9A:
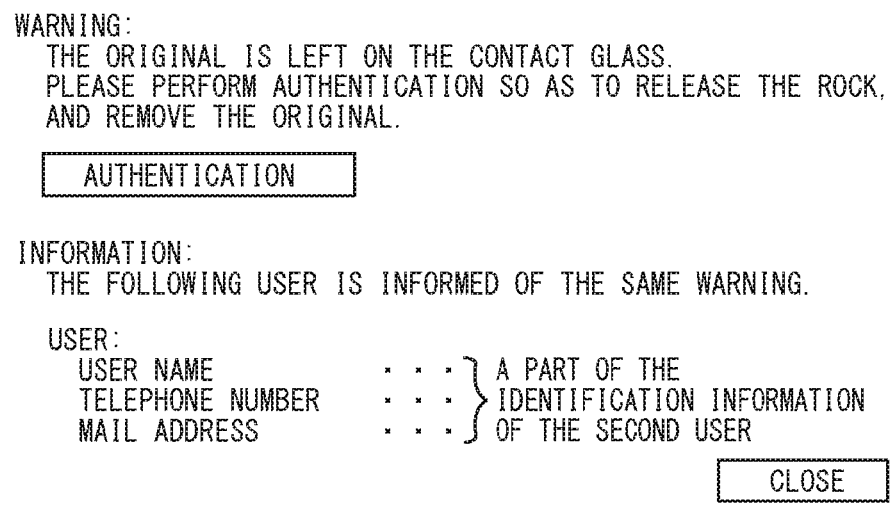
FIG. 9A is a view showing an example of leaving behind notification sent to a first PC, in a first displaying device according to the embodiment of the present disclosure.
Figure 9B:
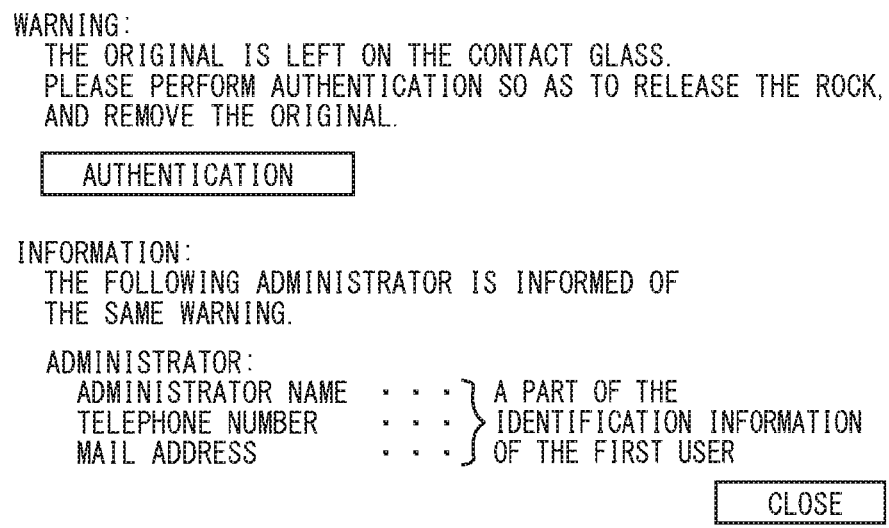
FIG. 9B is a view showing an example of leaving behind notification sent to a second PC, in a second displaying device according to the embodiment of the present disclosure.

Next, the controlling part 44 sends leaving behind notification (e.g. an e-mail) related to leaving behind of the original X on the contact glass 3 to the first PC 41 and the second PC 42, respectively (step S211). As shown in FIG. 9A, the leaving behind notification sent to the first PC 41 includes a part of the identification information of the second user. As shown in FIG. 9B, the leaving behind notification sent to the second PC 42 includes a part of the identification information of the first user.

Next, the controlling part 44 judges whether or not the authentication of one of the first user and the second user succeeds by the operation of the first inputting device 55 of the first PC 41 or the second inputting device 57 of the second PC 42 (step S212). For example, the controlling part 44 judges whether the password inputted to the first inputting device 55 of the first PC 41 matches with the password of the first user stored in the storing part 52 or the password inputted to the second input device of the second PC 42 matches with the password of the second user stored in the storing part 52.

When the authentication of none of the first user and the second user succeeds by operation of the first inputting device 55 of the first PC 41 or the second inputting device 57 of the second PC 42 (NO in step S212), the controlling part 44 repeats step S212 while continuing the operation of each locking mechanism 30.

When the authentication of one of the first user and the second user succeeds by the operation of the first inputting device 55 of the first PC 41 or the second inputting device 57 of the second PC 42 (YES in step S212), the controlling part 44 stops the operation of each locking mechanism 30 (step S213).

Next, the controlling part 44 sends the unlock notification (e.g. an e-mail) related to a stop of the operation of each locking mechanism 30 (step S214). The unlock notification is sent to the second PC 42 when the authentication of the first user succeeds by the operation of the first inputting device 55 of the first PC 41, and is sent to the first PC 41 when the authentication of the second user succeeds by the operation of the second inputting device 57 of the second PC 42. The unlock notification includes a message saying that "THE ROCK HAS BEEN RELEASED BY THE AUTHENTICATION OF . . . (an administrator name or a user name)", for example. When the unlock notification is sent, the first embodiment ends.

In the first embodiment, when the original detecting part 46 detects the original X and the user detecting part 47 does not detect a user in a state where the original reading device 5 has finished reading the original X, the controlling part 44 operates each locking mechanism 30 and the notifying mechanism 51, and when the authentication of the first user or the second user (specific user) succeeds in a state where each locking mechanism 30 is operated, the controlling part 44 stops the operation of each locking mechanism 30.

By combining a detection result of the original detecting part 46 and a detection result of the user detecting part 47 as described above, it is possible to accurately grasp that the original X is left behind, so that it is possible to reliably notify the user that the original X is left behind.

Further, by operating each locking mechanism 30 until the authentication of one of the first user and the second user succeeds, it is possible to prevent an unauthorized outsider from extracting the original X which the second user leaves behind, even when the second user does not become aware of the notification related to leaving behind of the original X. Consequently, it is possible to prevent confidential information of the original X from leaking.

In the first embodiment, when the original detecting part 46 detects the original X and the user detecting part 47 does not detect the user in the state where the original reading device 5 has finished reading the original X, the controlling part 44 operates each locking mechanism 30 and the notifying mechanism 51 during the operation time T1, and the controlling part 44 continues the operation of each locking mechanism 30 and stops the operation of the notifying mechanism 51 when the operation time T1 is finished. By applying such a configuration, it is possible to more reliably prevent the unauthorized outsider from extracting the original X which the second user leaves behind.

In the first embodiment, in a state where each locking mechanism 30 is operated, the controlling part 44 makes the displaying part 50 of the MFP 1 display each identification information of the first user and the second user and the warning related to leaving behind of the original X on the contact glass 3. By applying such a configuration, another user who wants to use an image reading function can make a direct contact with the first user or the second user, and make the first user or the second user execute the authentication to stop the operation of each locking mechanism 30.

In the first embodiment, when the authentication of one of the first user and the second user succeeds by the operation of the MFP 1 during the operation time T1, the controlling part 44 stops the operation of each locking mechanism 30, and when the operation time T1 is finished, the controlling part 44 sends the leaving behind notification related to leaving behind of the original X on the contact glass 3 to the first PC 41 and the second PC 42, and when the authentication of one of the first user and the second user succeeds by the operation of the first PC 41 or the second PC 42, the controlling part 44 stops the operation of each locking mechanism 30. By applying such a configuration, even when the first user and the second user are at distant places from the MFP 1 when the operation time T1 is finished, if the first user or the second user is authenticated by the operation of the first PC 41 or the second PC 42, the first user or the second user can stop the operation of each locking mechanism 30 without moving to the MFP 1. Further, the first user or the second user can ask another user who is near the MFP 1 to extract and keep the original X.

In the first embodiment, when the operation time T1 is finished, the operation of each locking mechanism 30 can be stopped only by the operation of the first PC 41 or the second PC 42, and the operation of each locking mechanism 30 is not stopped by the operation of the MFP 1. Consequently, it is possible to avoid a situation that an unauthorized user operates the MFP 1 without a permission and stops the operation of each locking mechanism 30.

In the first embodiment, in case where the second user makes the original reading device 5 read the original X, the leaving behind notification is sent to the first PC 41 and the second PC 42, and when the authentication of one of the first user and the second user succeeds by the operation of the first PC 41 or the second PC 42, the operation of each locking mechanism 30 is stopped, and the unlock notification is sent to the PC (the first PC 41 or the second PC 42) of another one of the first user and the second user. By applying such a configuration, it is possible to prevent double authentication of the first user and the second user to stop the operation of each locking mechanism 30, and improve convenience.

In the first embodiment, the controlling part 33 makes the leaving behind notification sent to the first PC (the PC of the first user) include the part of the identification information of the second user in case where the second user makes the original reading device 5 read the original X, and the controlling part 44 makes the leaving behind notification sent to the second PC 42 (the PC of the second user) include the part of the identification information of the first user in case where the second user makes the original reading device 5 read the original X. By applying such a configuration, the first user and the second user can contact each other. Consequently, it is possible to easily determine which one of the first user and the second user execute the authentication and extracts the original X.

In the first embodiment, "the case where the second user makes the original reading device 5 read the original X" includes the case where the second user is in the log-in state and the case where no user is in the log-in state and a user who has logged out last is the second user. Consequently, not only when the second user leaves behind the original X on the contact glass 3 while the second user is in the log-in state but also when the second user leaves behind the original X on the contact glass 3 even though the second user has logged out, it is possible to operate each locking mechanism 30 and the notifying mechanism 51.

Figure 10:
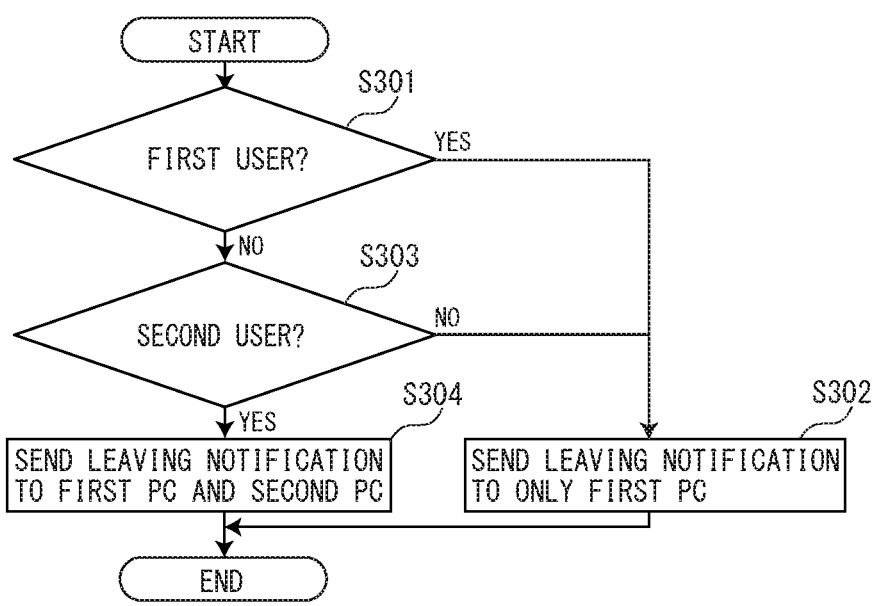
FIG. 10 is a flow chart showing sending control of the leaving behind notification, in the image forming system according to the embodiment of the present disclosure.
Figure 11:
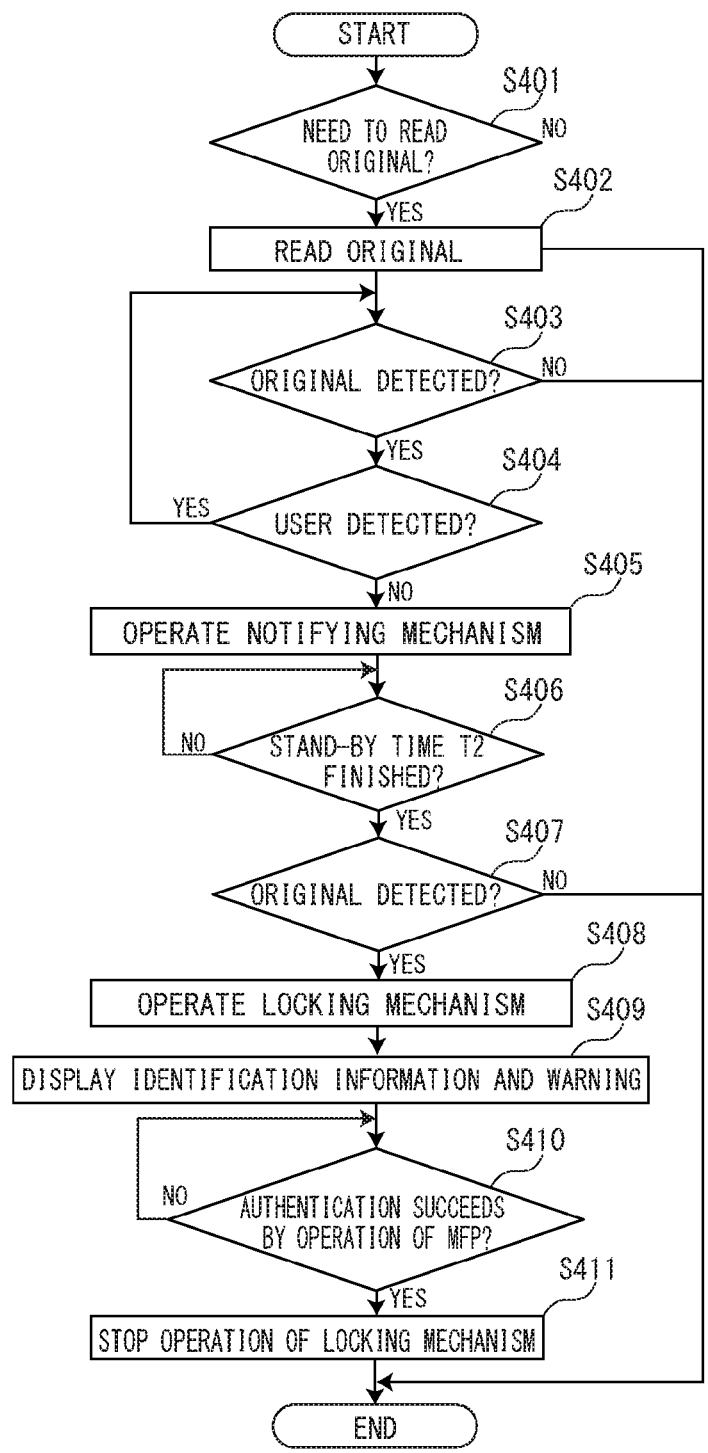
FIG. 11 is a flow chart showing a second embodiment of the control to prevent leaving behind of the original and the unfair extraction of the original, in the image forming system according to the embodiment of the present disclosure.

Next, an example of sending control of the leaving behind notification (see step S211 in the first embodiment) will be described with reference to FIG. 10.

First, the controlling part 44 judges whether or not the first user make the original reading device 5 read the original X (step S301). Incidentally, "the case where the first user make the original reading device 5 read the original X" includes a case where the first user is in the log-in state and a case where no user is in the log-in state and a user who has logged out last is the first user.

In case where the first user make the original reading device 5 read the original X (YES in step S301), the controlling part 44 sends the leaving behind notification to only the first PC 41 (step S302). That is, the controlling part 44 does not send the leaving behind notification to the second PC 42. Thus, the sending control of the leaving behind notification is finished.

In case where the first user does not make the original reading device read the original X (NO in step S301), the controlling part 44 judges whether or not the second user makes the original reading device 5 read the original X (step S303). Incidentally, "the case where the second user makes the original reading device 5 read the original X" includes a case where the second user is in the log-in state and a case where no user is in the log-in state and a user who has logged out last is the second user.

In case where the second user makes the original reading device 5 read the original X (YES in step S303), the controlling part 44 sends the leaving behind notification to the first PC 41 and the second PC 42 (step S304). Thus, the sending control of the leaving behind notification is finished.

In case where the second user does not make the original reading device 5 read the original X (NO in step S303), the controlling part 44 sends the leaving behind notification to only the first PC 41 (step S302). That is, the controlling part 44 does not send the leaving behind notification to the second PC 42. Thus, the sending control of the leaving behind notification is finished. Incidentally, a case where step S303 is NO is a case where a user (guest user) whose identification information is not stored in the storing part 52 makes the original reading device 5 read the original X, for example.

In the above-mentioned example, in case where the second user makes the original reading device 5 read the original X, the leaving behind notification is sent to the first PC 41 and the second PC 42, and in case where a user other than the first user and the second user makes the original reading device 5 read the original X, the leaving behind notification is sent to only the first PC. Consequently, it is possible to send the leaving behind notification to an appropriate sending destination.

Next, a second embodiment (hereinafter, referred to simply as "the second embodiment") of control to prevent leaving behind of the original X and unfair extraction of the original X will be described by using a case where the second user makes the original reading device 5 read the original X as an example. Incidentally, step S401 to step S404 of the second embodiment are the same as step S201 to step S204 of the first embodiment, and therefore will not be described. Further, description of the same steps other than step S401 to step S404 as the steps in the first embodiment will be optionally omitted.

When the user detecting part 47 detects the user (YES in step S404), the flow is transferred to step S403.

When the user detecting part 47 does not detect the user (NO in step S404), the controlling part 44 makes each locking mechanism 30 stand by and operates the notifying mechanism 51 (step S405).

Next, the controlling part 44 judges whether or not the stand-by time T2 of each locking mechanism 30 is finished (step S406). When the stand-by time T2 of each locking mechanism 30 is not finished (NO in step S406), step S406 is repeated.

When the stand-by time T2 of each locking mechanism 30 is finished (YES in step S406), the flow is transferred to judge as to whether or not the original detecting part 46 detects the original X (step S407). When the original detecting part 46 does not detect the original X (NO in step S407), the second embodiment is finished.

When the original detecting part 46 detects the original X (YES in step S407), the controlling part 44 operates each locking mechanism 30 (step S408). In this case, the controlling part 44 may continue the operation of the notifying mechanism 51, or may stop the operation of the notifying mechanism 51.

Next, the controlling part 44 makes the displaying part 50 of the MFP 1 display each identification information of the first user and the second user and the warning related to leaving behind of the original X on the contact glass 3 (step S409).

Next, the controlling part 44 judges whether or not the authentication of one of the first user and the second user succeeds by the operation of the inputting part 49 of the MFP 1 (step S410). When the authentication of none of the first user and the second user succeeds by the operation of the inputting part 49 of the MFP 1 (NO in step S410), the controlling part 44 repeats step S410 while continuing the operation of each locking mechanism 30.

When the authentication of one of the first user and the second user succeeds by the operation of the inputting part 49 of the MFP 1 (YES in step S410), the controlling part 44 stops the operation of each locking mechanism 30 (step S411). Thus, the second embodiment ends.

Similar to the first embodiment, in the second embodiment, when the original detecting part 46 detects the original X and the user detecting part 47 does not detect a user in a state where the original reading device 5 has finished reading the original X, the controlling part 44 operates each locking mechanism 30 and the notifying mechanism 51, and when the authentication of the first user and the second user (specific user) succeeds in a state where each locking mechanism 30 is operated, the controlling part 44 stops the operation of each locking mechanism 30.

In the second embodiment, when the original detecting part 46 detects the original X and the user detecting part 47 does not detect a user in a state where the original reading device 5 has finished reading the original X, the controlling part 44 makes each locking mechanism 30 stand by during the stand-by time T2 and operates the notifying mechanism 51, and each locking mechanism 30 is operated on condition that the original detecting part 46 still detects the original X even when the stand-by time T2 is finished. By applying such a configuration, if the second user becomes aware of notification related to leaving behind of the original X during the stand-by time T2, it is possible to take the original X without performing authentication and improve convenience.

Figure 12:
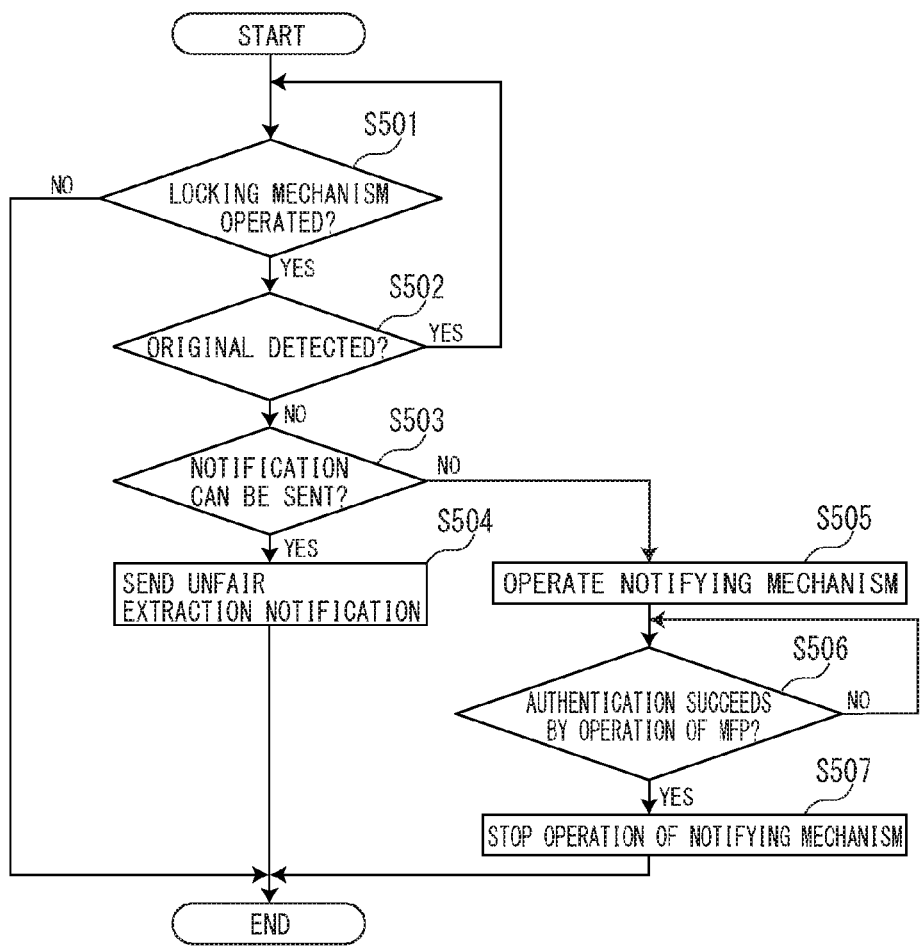
FIG. 12 is a flow chart showing control to notify the user of the unfair extraction of the original, in the image forming system according to the embodiment of the present disclosure.

Next, control to notify the user of unfair extraction of the original X will be described by using a case where the second user makes the original reading device 5 read the original X as an example, with reference to FIG. 12.

First, the controlling part 44 judges whether or not each locking mechanism 30 is operated (step S501). When each locking mechanism 30 is not operated (NO in step S501), control to notify the user of the unfair extraction of the original X ends.

When each locking mechanism 30 is operated (YES in step S501), the flow is transferred to judge as to whether or not the original detecting part 46 detects the original X (step S502). When the original detecting part 46 detects the original X (YES in step S502), the flow is transferred to step S501.

When the original detecting part 46 does not detect the original X (NO in step S502), the original X is not detected even though the operation of each locking mechanism 30 is not normally stopped, and therefore it is likely that the original X has been unfairly extracted from the contact glass 3. In such a case, the controlling part 44 judges whether or not it is possible to send a notification to at least one of the first PC 41 and the second PC 42 (step S503).

When it is possible to send the notification to at least one of the first PC 41 and the second PC 42 (YES in step S503), the controlling part 44 sends an unfair extraction notification (e.g. an e-mail) related to unfair extraction of the original X from the contact glass 3 to one or both of the first PC 41 and the second PC 42, and the control to notify the user of the unfair extraction of the original X ends. The unfair extraction notification includes a message saying that "THERE IS A RISK THAT THE ORIGINAL HAS BEEN UNFAIRLY EXTRACTED FROM THE CONTACT GLASS. PLEASE CHECK IMMEDIATELY", for example.

When it is not possible to send the notification to both of the first PC 41 and the second PC 42 (NO in step S503), the controlling part 44 operates the notifying mechanism 51 (step S505). Incidentally, a case where it is not possible to send the notification to both of the first PC 41 and the second PC 42 is a case where each identification information of the first user and the second user does not include an e-mail address, for example.

Next, the controlling part 44 judges whether or not the authentication of one of the first user and the second user succeeds by the operation of the inputting part 49 of the MFP 1 (e.g. by inputting a password) (step S506). When the authentication of none of the first user and the second user succeeds by the operation of the inputting part 49 of the MFP 1 (NO in step S506), the controlling part 44 repeats step S506 while continuing the operation of the notifying mechanism 51.

When the authentication of one of the first user and the second user succeeds by the operation of the inputting part 49 of the MFP 1 (YES in step S506), the controlling part 44 stops the operation of the notifying mechanism 51 (step S507) and the control to notify the user of the unfair extraction of the original X ends.

In the above-mentioned example, when each locking mechanism 30 is operated and the original detecting part 46 does not detect the original X, the controlling part 44 judges whether or not it is possible to send the notification to at least one of the first PC 41 and the second PC 42, and, when it is possible to send the notification to at least one of the first PC 41 and the second PC 42, the controlling part 44 sends the unfair extraction notification to one or both of the first PC 41 and the second PC 42 and, when it is not possible to send the notification to both of the first PC 41 and the second PC 42, the controlling part 44 operates the notifying mechanism 51. By applying such a configuration, it is possible to quickly notify the first user, the second user or a user around the MFP 1 of the unfair extraction of the original X.

In the present embodiment, the authentication of the user is performed by using a password authentication. Meanwhile, in other different embodiments, the authentication of the user may be performed by using biometric authentication such as fingerprint authentication or by using wireless authentication which uses a card reader or the like.

In the present embodiment, a PC (Personal Computer), which is a fixed terminal, is used as a terminal device. Meanwhile, in the other different embodiments, a mobile terminal such as a mobile phone or a smartphone may be used as a terminal device.

In the present embodiment, a part of identification information of a specific user is displayed on the displaying part 50 of the MFP 1 in a state where each locking mechanism 30 is operated. Meanwhile, in the other different embodiments, when the identification information is registered, a user may select whether or not a part or the entirety of identification information of a specific user is displayed on the displaying part 50 of the MFP 1 in a state where each locking mechanism 30 is operated. Incidentally, when identification information of the specific user is not displayed on the displaying part 50 of the MFP 1 at all, a user needs to input both of a user name and authentication information (e.g. a password) to the inputting part 49 of the MFP 1 upon authentication.

In the present embodiment, both of the first user (the user who has an administrative authority and whose identification information is stored in the storing part 52) and the second user (the user who does not have the administrative authority and whose identification information is stored in the storing part 52) are regarded as "specific users" when the second user makes the original reading device 5 read the original X. Meanwhile, in the other different embodiments, in case where the second user makes the original reading device 5 read the original X, only one of the first user and the second user may be a "specific user". Thus, the "specific user" may be selected from users who can be authenticated (users whose identification information is stored in the storing part 52) in any way. Meanwhile, the "specific users" preferably include at least a user who makes the original reading device 5 read the original X.

Although not described in particular in the present embodiment, in the other different embodiments, only in case where users (e.g. the first user and the second user) whose identification information is stored in the storing part 52 make the original reading device 5 read the original X, each locking mechanism 30 may be operated, and, in case where a user (guest user) whose identification information is not stored in the storing part 52 makes the original reading device 5 read the original, each locking mechanism 30 may not be operated. In case where the user (guest user) whose identification information is not stored in the storing part 52 makes the original reading device 5 read the original, even if each locking mechanism 30 protects the original X, it is possible that to whom the original X belongs is not known and the original X cannot be returned, and therefore a necessity to protect the original X is low.

In the present embodiment, the configuration of the present disclosure is applied to the MFP 1. In another embodiment, the configuration of the present disclosure may be applied to an image forming apparatus other that MFP 1, such as a copying machine, a scanner or a facsimile.

While the present disclosure has been described with reference to the particular illustrative embodiments, it is not to be restricted by the embodiments. It is to be appreciated that those skilled in the art can change or modify the embodiments without departing from the scope and spirit of the present disclosure.

What is claimed is:
1. An image forming apparatus comprising:
an original setting part;
an original reader reading an original set on the original setting part;
a cover switchable between an opening posture to allow extraction of the original from the original setting part and a closing posture to restrict the extraction of the original from the original setting part;
a holder holding the cover in the closing posture;
a notifier notifying a user that the original is left behind on the original setting part;
an original detector detecting the original set on the original setting part;
a user detector detecting the user; and
a controller executing a log-in process to put the user in a log-in state, wherein the controller is configured to operate the holder and the notifier on condition that the original detector detects the original and the user detector does not detect the user in a state where the original reader has finished reading the original, and the controller is configured to stop operation of the holder on condition that authentication of a specific user succeeds in a state where the holder is operated,
the image forming apparatus further comprising a memory storing an operation time of the notifier,
wherein the controller is configured to operate the holder and the notifier during the operation time on condition that the original detector detects the original and the user detector does not detect the user in the state where the original reader has finished reading the original, and the controller is configured to continue the operation of the holder and to stop operation of the notifier when the operation time is finished.

2. The image forming apparatus according to claim 1, wherein the controller is configured to simultaneously operate the holder and the notifier.

3. The image forming apparatus according to claim 1, wherein the controller is configured to stop the operation of the holder on condition that the authentication of the specific user including the user who makes the original reader read the original succeeds in the state where the holder is operated.

4. The image forming system comprising:
the image forming apparatus according to claim 1; and
a terminal device connected to the image forming apparatus via a network,
wherein the controller is configured to stop the operation of the holder on condition that the authentication of the specific user succeeds by an operation of the image forming apparatus during the operation time, and the controller is configured to send leaving behind notification related to leaving behind of the original on the original setting part to the terminal device of the specific user and to stop the operation of the holder on condition that the authentication of the specific user succeeds by an operation of the terminal device when the operation time is finished.

5. The image forming system according to claim 4, wherein the memory is configured to store identification information of a first user who has an administrative authority and identification information of a second user who does not have the administrative authority, and
the controller is configured to send the leaving behind notification to terminal devices of the first user and the second user when the second user makes the original reader read the original and the controller is configured to stop the operation of the holder on condition that authentication of one of the first user and the second user succeeds by the operation of the terminal device and to send the unlock notification related to the stop of the operation of the holder to the terminal device of another one of the first user and the second user.

6. The image forming system according to claim 5, wherein the controller is configured to make the leaving behind notification which is sent to the terminal device of the first user include at least a part of the identification information of the second user when the second user makes the original reader read the original, and the controller is configured to make the leaving behind notification which is sent to the terminal device of the second user include at least a part of the identification information of the first user when the second user makes the original reader read the original.

7. The image forming system according to claim 4, wherein the memory is configured to store identification information of a first user who has an administrative authority and identification information of a second user who does not have the administrative authority, and
the controller is configured to send the leaving behind notification to terminal devices of the first user and the second user when the second user makes the original reader read the original, and the controller is configured to send the leaving behind notification to the terminal device of the first user without sending the leaving behind notification to the terminal device of the second user when a user other than the first user and the second user makes the original reader read the original.

8. An image forming system comprising:
the image forming apparatus according to claim 1; and
a terminal device connected to the image forming apparatus via a network.

9. An image forming apparatus comprising:
an original setting part;
an original reader reading an original set on the original setting part;
a cover switchable between an opening posture to allow extraction of the original from the original setting part and a closing posture to restrict the extraction of the original from the original setting part;
a holder holding the cover in the closing posture;
a notifier notifying a user that the original is left behind on the original setting part;
an original detector detecting the original set on the original setting part;
a user detector detecting the user; and
a controller executing a log-in process to put the user in a log-in state, wherein the controller is configured to operate the holder and the notifier on condition that the original detector detects the original and the user detector does not detect the user in a state where the original reader has finished reading the original, and the controller is configured to stop operation of the holder on condition that authentication of a specific user succeeds in a state where the holder is operated,
the image forming apparatus further comprising a display displaying an operation screen,
wherein the controller is configured to make the display display at least a part of identification information of the specific user and a warning related to leaving behind of the original on the original setting part in the state where the holder is operated,
wherein the display is configured to display a function available even in the state where the holder is operated, the function being displayed on a warning screen displaying at least the part of the identification information of the specific user and the warning related to leaving behind of the original on the original setting part, or the function being displayed on a screen displayed when the warning screen is closed.

10. An image forming system comprising:
the image forming apparatus according to claim 9; and
a terminal device connected to the image forming apparatus via a network.

11. An image forming system comprising:
an image forming apparatus which includes:
an original setting part;
an original reader reading an original set on the original setting part;
a cover switchable between an opening posture to allow extraction of the original from the original setting part and a closing posture to restrict the extraction of the original from the original setting part;
a holder holding the cover in the closing posture;
a notifier notifying a user that the original is left behind on the original setting part;
an original detector detecting the original set on the original setting part;
a user detector detecting the user; and
a controller executing a log-in process to put the user in a log-in state, wherein the controller is configured to operate the holder and the notifier on condition that the original detector detects the original and the user detector does not detect the user in a state where the original reader has finished reading the original, and the controller is configured to stop operation of the holder on condition that authentication of a specific user succeeds in a state where the holder is operated; and a terminal device connected to the image forming apparatus via a network, wherein the controller is configured to judge whether or not it is possible to send notification to the terminal device of the specific user on condition that the holder is operated and the original detector does not detect the original, and the controller is configured to send unfair extraction notification related to unfair extraction of the original from the original setting part to the terminal device of the specific user if it is possible to send the notification to the terminal device of the specific user, and the controller is configured to operate the notifier if it is not possible to send the notification to the terminal device of the specific user.

* * * * *